United States Patent Office 3,240,767
Patented Mar. 15, 1966

3,240,767
ACETONITRILE SOLUBLE COPOLYMERS OF ACRYLONITRILE AND ALICYCLIC ALCOHOL ESTERS OF ACRYLIC AND METHACRYLIC ACIDS
John R. Caldwell and Edward H. Hill, Kingsport, Tenn., assignors to Eastman Kodak Company, Rochester, N.Y., a corporation of New Jersey
No Drawing. Filed Dec. 26, 1961, Ser. No. 162,260
10 Claims. (Cl. 260—85.5)

This invention relates to acrylonitrile polymers that are soluble in acetonitrile, and more particularly to the preparation of acetonitrile-soluble copolymers of acrylonitrile and certain alicyclic alcohol esters of acrylic and methacrylic acids.

It is well known that acrylonitrile can be copolymerized with various alkyl acrylates and methacrylates to give resinous polymers that retain many of the properties of both components. However, these prior art copolymers are generally of limited solubilities in common organic solvents when the proportion of acrylonitrile therein equals 60 percent or more, based on the weight of the copolymer. Where the proportions of components are such as to give copolymers of wider ranges of solubilities, i.e., good solubility in common organic solvents, the physical properties have been found unsuitable for films or fibers. For example, the softening points are too low for textile purposes. Accordingly, it would be highly advantageous for textile purposes to provide acrylonitrile/acrylic esters that would combine therein both the properties of good solubility in one or more of the common organic solvents and relatively high softening point. We have now discovered that certain alicyclic alcohol esters of acrylic and methacrylic acid on copolymerization with acrylonitrile, in the proportions specified hereinafter, fulfill the above requirements of being readily soluble in acetonitrile at room temperatures, although higher temperatures can be used as desired, and at the same time having softening or sticking point values above 200° C., more specifically from about 205 to 230° C.

It is, accordingly, an object of the invention to provide copolymers of acrylonitrile and alicyclic alcohol esters of acrylic and methacrylic acids which are characterized by good solubility in acetonitrile and having unusually high softening or sticking points. Another object is to provide films and fibers thereof. Another object is to provide acetonitrile coating compositions of the above copolymers. Another object is to provide means for preparing the same. Other objects will become apparent hereinafter.

In accordance with the invention, we prepare the acetonitrile-soluble copolymers of the invention by subjecting to polymerizing conditions a mixture comprising (1) from 60 to 80 percent, but preferably from 65 to 75 percent by weight of acrylonitrile and (2) from 40 to 20 percent but preferably from 35 to 25 percent by weight of an alicyclic alcohol ester of acrylic or methacrylic acid represented by the general formula:

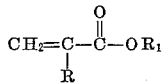

wherein R is hydrogen or methyl group and $R_1$ is a monovalent alicyclic radical selected from the group having the following formulas:

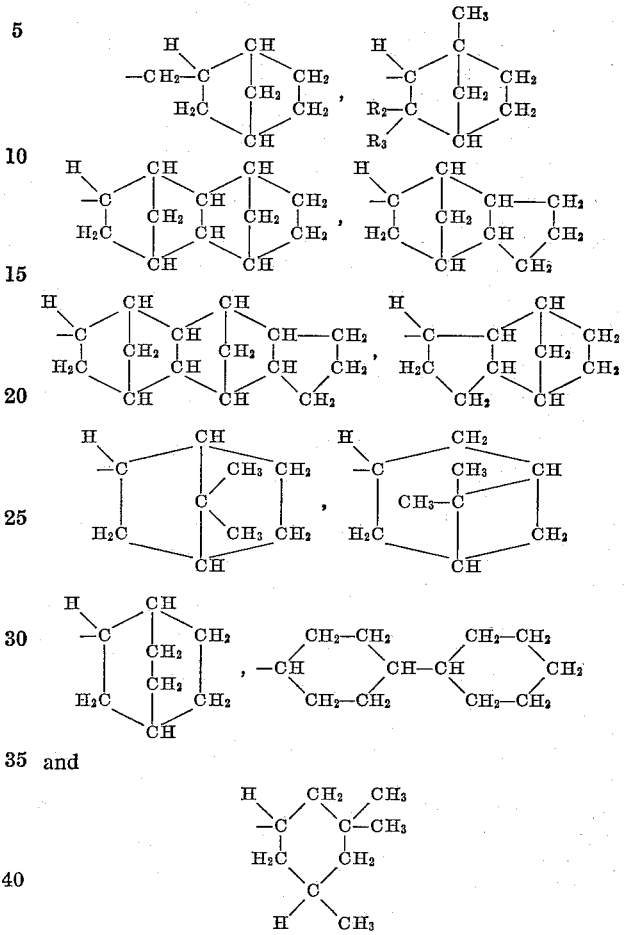

and

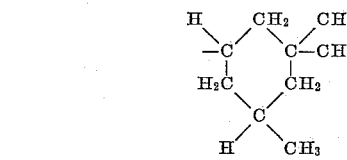

wherein each of $R_2$ and $R_3$ are hydrogen or alkyl groups of from 1 to 4 carbon atoms, in a polymerization reaction medium consisting essentially of acetonitrile for preparing the copolymers containing from 60 to 75 percent by weight of the acrylonitrile and from 40 to 25 percent by weight of one or more of the said alicyclic esters, and a mixture of from 93 to 97 percent by weight of acetonitrile and from 7 to 3 percent by weight of a higher boiling polyacrylonitrile solvent such as dimethyl formamide, α-butyrolactone, ethylene carbonate or dimethylsulfide for preparing the copolymers containing more than 75 percent by weight of the acrylonitrile, the remainder of the copolymer molecule being one or more of said alicyclic esters, until a clear viscous solution is obtained. The above $R_1$ formulas correspond to the radicals 2-norcamphanylmethyl; fenchyl; decahydro-1,4-exo-5,8-endodimethanonaphth-2-yl; hexahydro - 4,7-methanoindan-5-yl; dodecahydro - 4,9,5,8 - dimethano-1-cyclopenta(b)-naphthalen-6-yl; hexahydro-4,7-methanoidan-1-yl; 7,7-dimethyl-2-norcamphanyl; 7,7 - dimethylbicyclo[3.1.1]heptan-3-yl; bicyclo[2.2.2]octan-2-yl; 4-bicyclohexyl. The copolymer may be separated from the reaction solution by conventional means as by precipitation in a nonsolvent, or the reaction solution can be used directly without separation of the copolymer for coating into clear flexible films or spun into fibers having excellent physical properties. The outstanding and preferred copolymers are those prepared according to the examples set forth hereinafter. All of the copolymers coming within the above range of proportions are soluble in acetonitrile or in the stated mixtures consisting essentially of acetonitrile. We have found further that copolymers made by our process whose proportions are outside the specified ranges are not satisfactory for applicants' purpose. Thus those containing less than 65 percent of acrylonitrile are unsuitable for film and fiber making, while those containing more than 80 percent of acrylonitrile are not soluble in acetonitrile.

Advantageously, the copolymerizations are carried out in the presence of a polymerization catalyst which is soluble in acetonitrile such as benzoyl peroxide, acetyl peroxide, 2,2'-azobis(2-methylpropionitrile), etc. The amount of catalyst employed can vary quite widely, but amounts ranging from 0.1 to 2 percent, or even 5 percent, based on the total weight of monomers has been found highly efficacious. The temperature can vary from moderately above room temperature to the boiling temperature of acetonitrile, but preferably from about 40 to 70° C. The period for carrying out the copolymerizations to 70 percent or more conversion of the monomers to the copolymers is dependent on the temperature. However, from 12 to 36 hours at 50 to 60° C. is efficacious. While the copolymerizations are preferably carried out under normal atmospheric conditions, good conversions to the copolymers are also obtainable employing pressures substantially below or above atmospheric pressures. In general, the copolymers produced by the process of the invention contain the two components in the polymer molecule in about the same proportions as they are present in the starting polymerization mixtures. The monovalent alicyclic alcohol esters of acrylic and methacrylic acid employed in the invention can be readily prepared by esterification of the acids by the appropriate alicyclic alcohols or by ester exchange methods, employing known esterification catalysts. In this connection, reference may be had to A. M. Clifford, U.S. Patent No. 2,363,044, dated November 21, 1944; D. T. Mowry et al., U.S. Patent No. 2,454,743, dated November 23, 1948; and A. B. Craig et al., U.S. Patent No. 2,486,376, dated November 1, 1949. As indicated in the preceding the radicals $R_1$ of these alcohols are alicyclic hydrocarbons containing from 7 to 15 carbon atoms.

The following examples will serve to illustrate further our new copolymers and the manner of their preparation and uses.

*Example 1*

The following materials were mixed in a pressure bottle and tumbled at 50° C. for 24 hours in a constant temperature water bath:

15 g. acrylonitrile
5 g. hexahydro-4,7-methano indan-5-yl acrylate, having the structure:

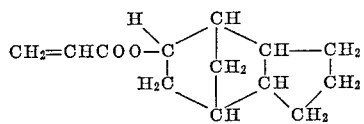

80 ml. acetonitrile
0.2 g. 2,2'-azobis[2-methylpropionitrile]

A clear, viscous dope was obtained from which clear, flexible films were cast. These films had the following physical and electrical properties.

Modulus: $4.32 \times 10^5$ p.s.i.
Tensile strength: 16,800 p.s.i.
Elongation: 13.5%
Dissipation factor: 2% to 5% from 25° to 85°
Dielectric constant: 4% to 9% from 25° to 85°
Dielectric strength: 2200 volts/mil Analysis of the copolymer obtained by precipitation of the reaction mixture into water, washing and drying indicated that it was a copolymer consisting of approximately 75 percent by weight of acrylonitrile units and 25 percent by weight of hexahydro-4,7-methano indan-5-yl acrylate units. The sticking temperature of the fibers made from the polymer was 210–214°.

*Examples 2 and 3*

These examples illustrate the critical difference in solubility of the resulting copolymer when Example 1 is repeated in all respects of procedure, except that it was carried out by an emulsion in water and mass copolymerization techniques.

(2) The following materials were tumbled in a pressure bottle at 50° C. for 24 hours:

15 g. acrylonitrile
5 g. hexahydro-4,7-methano indan-5-yl acrylate
100 ml. water
0.8 g. lauryl sulfate
0.2 g. ammonium persulfate
0.1 g. sodium bisulfite The product was obtained as a grainy, white precipitate which was washed with water and isopropyl alcohol and dried. The yield was 19.2 g. and a nitrogen analysis showed that the polymer contained 74.4 percent acrylonitrile. The polymer could not be dissolved in acetonitrile though its composition was the same as that of Example 1.

(3) The following materials were tumbled in a pressure bottle at 50° for 24 hours:

15 g. acrylonitrile
5 g. hexahydro-4,7-methano indan-5-yl acrylate
0.2 g. acetyl peroxide The clear hard copolymer obtained was not soluble in acetonitrile.

*Example 4*

The following materials were mixed in a pressure bottle and tumbled at 50°, for 32 hours:

13 g. acrylonitrile
7 g. hexahydro-4,7-methano idan-5-yl acrylate
80 ml. acetonitrile
0.2 g. acetyl peroxide A clear, viscous dope was obtained which could be cast into strong, flexible films. It had the composition consisting of about 65 percent by weight of combined acrylonitrile units and 35 percent by weight of combined units of the said acrylate.

*Example 5*

The following materials were stirred under nitrogen at 50 to 55° for 24 hours:

280 g. acrylonitrile
120 g. acrylic acid, 2-methyl-3-norcamphane methanol, ester having the structure:

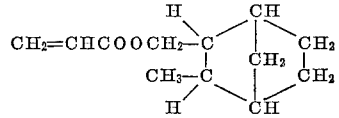

800 ml. acetonitrile
2.0 g. 2,2'-azobis[2-methylpropionitrile]

A viscous dope was obtained which was dry spun into fibers having the following physical properties.

Tenacity: 2.1 g./den.
Elongation: 19%
Hot bar sticking point: 210°
Flow point at 0.2 g./den. 220°

The isolated copolymer was found to consist of approximately 70 percent by weight of combined acrylonitrile units and 30 percent by weight of combined units of said ester. These properites may be compared with those of yarns prepared from other acrylates and methacrylates having about the same number of carbon atoms in their structure but not having an alicyclic ring:

| Copolymer Composition | Tenacity, g./den. | Elongation, percent | Sticking Point, deg. | Flow Point at 0.2 g./den., deg. |
|---|---|---|---|---|
| Copolymer of Example 5 | 2.1 | 19 | 210 | 220 |
| 70% AN 30% n-hexyl methacrylate | 2.7 | 15 | 118 | 152 |
| 70% AN 30% 2-ethyl-hexyl acrylate | 2.2 | 22 | 178 | 152 |
| 70% AN 30% octyl methacrylate | 1.9 | 19 | 90 | 140 |

It is obvious from this data that our polymer has superior properties. The symbol AN stands for acrylonitrile.

*Example 6*

Using the procedure of Example 4, there was obtained a clear, viscous dope of a copolymer having the composition by weight of 68 parts acrylonitrile, 32 parts acrylic acid, 2-methyl-3-norcamphane methanol, ester. Films were cast from the dope having the following physical properties.

Modulus: $4.64 \times 10^5$ p.s.i.
Tensile strength: 11,100 p.s.i.
Elongation: 11%.

*Example 7*

Using the procedure of Example 5, a yarn was prepared from a copolymer having the composition: 70 parts acrylonitrile, 30 parts methacrylic acid, 7,7-dimethylbicyclo[2.2.1]hept-6-yl, ester. It had a tenacity of 2.3 g./den., an elongation of 18%, and a hot bar sticking point of 208° C.

*Example 8*

A copolymer of 75 percent by weight of acrylonitrile and 25 percent by weight of fenchyl acrylate was made in acetonitrile, as described in Example 5 above. Fibers spun from the solution had a hot bar sticking temperature of 210 to 215° C. after they were drafted and heat-set.

*Example 9*

A copolymer of 80 parts acrylonitrile and 20 parts hexahydro-4,7-methano indan-5-yl acrylate was made in a mixture of 95 parts acetonitrile and 5 parts dimethylformamide. A clear, viscous dope was obtained which was dry spun into fibers having a hot bar sticking temperature of 220–225° C. after drafting and heat-setting.

Other generally similar copolymers coming within the scope of the invention may be prepared by substituting in the above examples like amounts of any other of the mentioned alicyclic alcohol esters of acrylic and methacrylic acids. These products also are soluble in acetonitrile and have unusually high softening points above 200° C., and solutions thereof in acetonitrile can also be coated into clear flexible and tough films or spun into high quality fibers by conventional means. It will be understood that limited amounts of chemically inert materials such as dyes, pigments, plasticizers, etc., can advantageously be incorporated into the polymerization reaction mixtures at any stage of polymerization or added subsequently to the isolated polymeric products, and that these will give added effects and utility to the resulting coatings, films and fibers. The copolymers of the invention are also readily moldable into useful shaped articles.

This invention has been described in detail with particular reference to preferred embodiments thereof, but it will be understood that variations and modifications can be effected within the spirit and scope of the invention as described hereinabove and as defined in the appended claims.

What we claim is:

1. A process for preparing an acetonitrile-soluble resinous copolymer consisting essentially of from 60 to 80 percent by weight of acrylonitrile units and from 40 to 20 percent by weight of units of an alicyclic ester as defined below, which comprises heating at a temperature between about 20° C. and about 82° C. in the presence of a free-radical catalyst, a polymerization reaction mixture consisting predominantly of acetonitrile and containing (1) a polymerization catalyst that is soluble in the said acetonitrile and (2) a monomer mixture consisting of from 60 to 80 percent by weight of acrylonitrile and from 40 to 20 percent by weight of an alicyclic ester represented by the following structural formula:

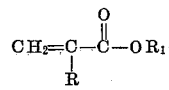

wherein R represents a member selected from the group consisting of hydrogen and methyl group and $R_1$ represents a member selected from the group consisting of

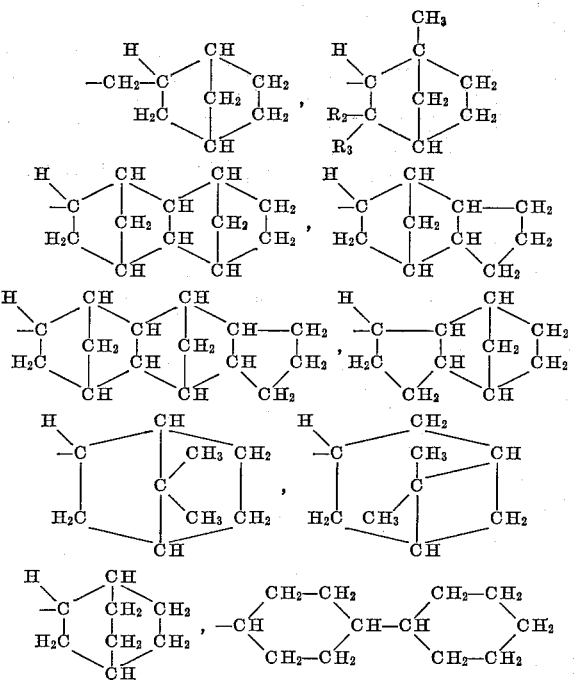

and

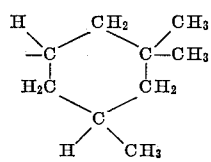

wherein each of $R_2$ and $R_3$ represent a member selected from the group consisting of a hydrogen atom and an alkyl group of from 1 to 4 carbon atoms until at least 70 percent of the said monomer mixture has been converted to the said resinous copolymer having a softening point of from 205 to 230° C.

2. A process for preparing an acetonitrile-soluble resinous copolymer consisting essentially of from 65 to 75 percent by weight of acrylonitrile units and from 35 to 25 percent by weight of hexahydro-4,7-methano indan- 5-yl acrylate units, which comprises heating in the presence of a free-radical catalyst a polymerization reaction mixture consisting predominantly of acetonitrile and containing (1) 2,2'-azobis[2-methylpropionitrile] as polymerization catalyst, and (2) a monomer mixture consisting of from 65 to 75 percent by weight of acrylonitrile and from 35 to 25 percent by weight of hexahydro-4,7-methano indan-5-yl acrylate, until at least 70 percent of the said monomer mixture has been converted to the said copolymer having a softening point of from 205 to 230° C.

3. A process for preparing an acetonitrile-soluble copolymer consisting essentially of from 65 to 75 percent by weight of acrylonitrile units and 35 to 25 percent by weight of 2-methyl-3-norcamphane methanol, acrylic acid ester units, which comprises heating in the presence of a free-radical catalyst a polymerization reaction mixture consisting predominantly of acetonitrile and containing (1) 2,2'-azobis[2-methylpropionitrile] as polymerization catalyst and (2) a monomer mixture consisting of from 65 to 75 percent by weight of acrylonitrile and from 35 to 25 percent by weight of 2-methyl-3-norcamphane methanol, acrylic acid ester, until at least 70 percent of the said monomer mixture has been converted to the said copolymer having a softening point of from 205 to 230° C.

4. A process for preparing an acetonitrile-soluble copolymer consisting essentially of from 65 to 75 percent by weight of acrylonitrile units and from 35 to 25 percent by weight of 7,7-dimethylbicyclo[2.2.1]hept-6-yl, methacrylic acid ester units, which comprises heating in the presence of a free-radical catalyst a polymerization reaction mixture consisting predominantly of acetonitrile and containing (1) 2,2'-azobis[2-methylpropionitrile] as polymerization catalyst, and (2) a monomer mixture consisting of from 65 to 75 percent by weight of acrylonitrile and from 35 to 25 percent by weight of 7,7-dimethylbicyclo[2.2.1]hept-6-yl, methacrylic acid ester, until at least 70 percent of the said monomer mixture has been converted to the said copolymer having a softening point of from 205 to 230° C.

5. A process for preparing an acetonitrile-soluble copolymer consisting essentially of from 65 to 75 percent by weight of acrylonitrile units and from 35 to 25 percent by weight of fenchyl acrylate units, which comprises heating in the presence of a free-radical catalyst a polymerization reaction mixture consisting predominantly of acetonitrile and containing (1) 2,2'-azobis[2-methylpropionitrile] as polymerization catalyst and (2) a monomer mixture consisting of from 65 to 75 percent by weight of acrylonitrile and from 35 to 25 percent by weight of fenchyl acrylate until at least 70 percent of the said monomer mixture has been converted to the said copolymer having a softening point of from 205 to 230° C.

6. A copolymer prepared according to the process of claim 1.

7. A copolymer prepared according to the process of claim 2.

8. A copolymer prepared according to the process of claim 3.

9. A copolymer prepared according to the process of claim 4.

10. A copolymer prepared according to the process of claim 5.

References Cited by the Examiner
UNITED STATES PATENTS

| | | | |
|---|---|---|---|
| 2,363,044 | 11/1944 | Clifford | 260—89.5 |
| 2,929,806 | 3/1960 | Marvel et al. | 260—86.7 |
| 3,033,848 | 5/1962 | Caldwell | 260—85.5 |

JOSEPH L. SCHOFER, *Primary Examiner.*

LOUISE P. QUAST, DONALD E. CZAJA, *Examiners.*